Figure 1:
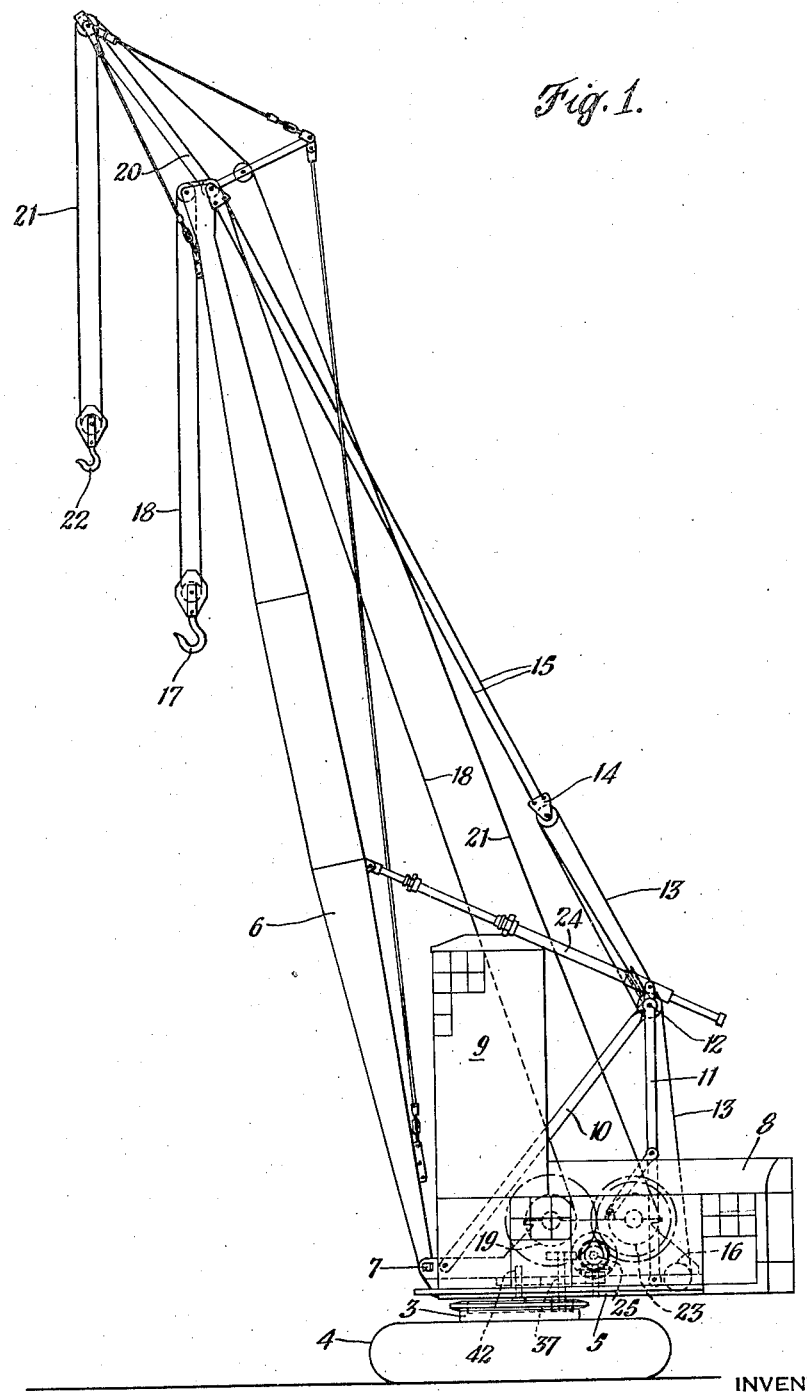

Aug. 23, 1949.  W. M. HUSTON  2,479,838
LOAD HANDLING EQUIPMENT
Filed Dec. 27, 1945  2 Sheets-Sheet 1

INVENTOR
William M. Huston
BY
ATTORNEYS

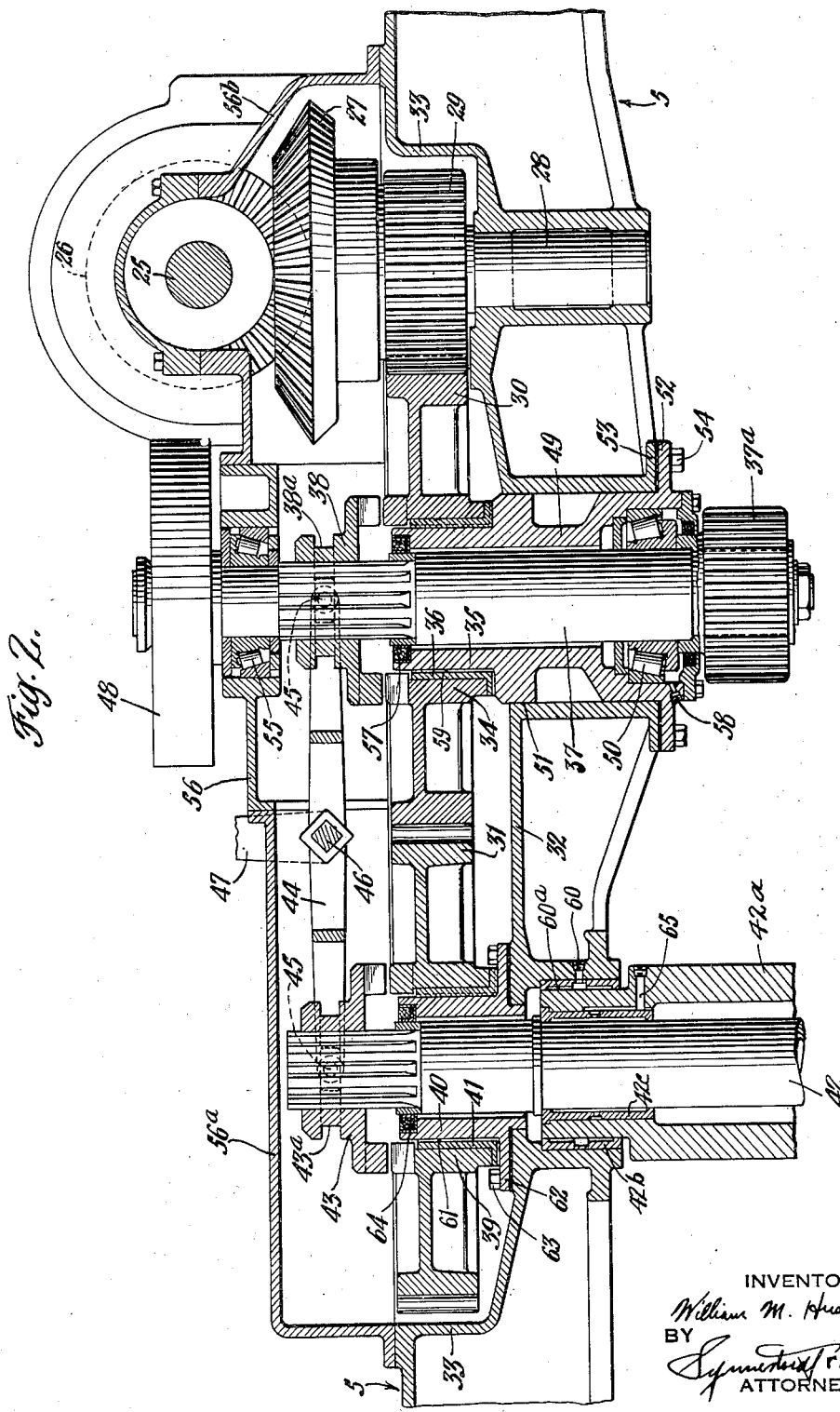

Patented Aug. 23, 1949

2,479,838

UNITED STATES PATENT OFFICE 2,479,838

LOAD HANDLING EQUIPMENT

William M. Huston, Lima, Ohio

Application December 27, 1945, Serial No. 637,309

7 Claims. (Cl. 212—69)

This invention relates to load handling equipment and is particularly concerned with that type of load handling equipment incorporating a rotating base mounted for swing motion on a crawler truck. The invention is applicable to load handling machines of various types, including cranes, shovels, draglines, etc.

In machines of the type above mentioned power transmission mechanism is provided, including a shaft extended vertically downwardly from the rotating base to the crawler truck for delivery of power from the power plant located on the rotating base to the crawler truck and from there to the treads, to effect traveling or propel motion. This vertically extending shaft usually also defines or is coincident with the vertical axis about which the rotating base may swing. In addition, such machines are provided with another vertically mounted shaft adapted to be driven from the power plant on the rotating base and serving to effect swing motion of the base. Gearing, clutches and like driving elements are associated with the vertical shafts, these elements being mounted on the rotating base. The present invention is especially concerned with the portions of the mechanism just mentioned.

One of the primary objects of the invention is to provide a novel arrangement of lubricant reservoir or pocket in the rotating base, associated with the driving elements, such as gears which are adapted to be coupled with the vertically extended shafts, the lubricant pocket being equipped, in the region of said shafts, with vertical sleeves arranged in a manner to prevent leakage and loss of lubricant from the reservoir or pocket.

A further feature of the invention is involved in the employment of the sleeves above mentioned as supporting bearings for said gears.

How the foregoing and other objects and advantages are obtained will appear more fully from the following description referring to the accompanying drawings, in which—

Figure 1 is a somewhat diagrammatic side elevational outline view of a crane of the type to which the invention is particularly applicable; and Figure 2 is a fragmentary vertical sectional view through a portion of the rotating base structure in the region of the vertical power shafts which extend downwardly for cooperation with mechanisms on the crawler truck, this view being on a greatly enlarged scale as compared with Figure 1.

Referring first to Figure 1, the crawler truck is indicated at 3, the truck being provided with crawler treads, such as are diagrammatically indicated at 4. The rotating base structure is shown at 5 and this base serves to carry the power plant (not shown), the operating machinery, and the boom 6, which latter, as is shown, has its foot end pivotally connected as at 7 with the rotating base toward the forward end thereof, to provide for upward and downward swinging movement of the boom. The operating machinery carried by the base is housed within a cab structure 8 and, in the particular machine illustrated, a control tower 9 is provided in accordance with the disclosure of my copending application, Serial No. 603,376, filed July 5, 1945.

A gantry structure, including front compression legs 10 and rear tension legs 11 is also carried by the rotating base 5, the gantry serving to support a shaft 12 carrying sheaves with which the boom hoist cable 13 is associated. This cable is also associated with additional sheaves carried by a sling 14 which is connected with the boom point by means of sling cables 15. The ends of the boom hoist cable 13 are extended downwardly to be reeved on the boom hoist drums, one of which appears at 16.

In the machine illustrated, a hook 17 is supported by means of hoist cable 18 which is extended over sheaves at the boom point and thence downwardly to the hoist drum 19. The boom is also provided with an extension or jib 20 carrying sheaves cooperating with the hoist cable 21 which serves to support the hook 22. Cable 21 extends downwardly to be reeved onto the hoist drum 23.

The portions of the structure above described need not be considered in detail herein, since they form no part of the present invention per se. For fuller disclosure of the above mentioned portions of the machine, reference may be had to the copending application fully identified above.

It is also mentioned that in the machine illustrated, telescopic boom stops 24 are provided, these boom stops being extended between the boom and the head of the gantry. This mechanism also need not be considered in detail herein, although it is noted that a full disclosure thereof appears in my copending application Serial No. 603,378, filed July 5, 1945.

Turning now to Figure 2, reference is first made to the horizontal reversing shaft 25 which is adapted to be driven in their direction and serves as a portion of the power transmission from the power plant carried on the rotating base to certain other shafts shown in Figure 2, The reversing shaft 25 has a bevel pinion 26 fixed thereto and meshing with the bevel gear 27 which is mounted at the upper end of shaft 28, supported in a socket formed in the rotating base structure 5. This shaft also supports a pinion 29, the pinion 29 and the gear 27 preferably being fixed to each other and rotatively mounted on the shaft 28. Pinion 29 meshes with gear 30 which, in turn, meshes with gear 31, the pinion 29 and the gears 30 and 31 being received in a lubricant reservoir or pocket formed in the rotating base structure 5, the pocket being defined by a bottom wall 32 and upright walls 33. It may be mentioned that the rotating base 5 may either comprise a casting, or may be a fabricated structure, made up, for example, of welded plates, webs, etc.

The hub 34 of gear 30 is supported by a sleeve 35, which carries a bearing sleeve 36. This gear is adapted to be connected with the vertical swing shaft 37 by means of a clutch device 38 which is splined to the shaft and which is provided with projecting clutch dogs engaged with complementary dogs formed in the upper portion of the gear hub 34. The lower end of the vertical swing shaft 37 carries a pinion 37a which is adapted to mesh with an internal ring gear formed on the truck structure just below the rotating base, so that rotation of shaft 37 causes the rotating base to turn about the vertical axis of swing motion.

Similarly, the hub 39 of gear 31 is carried by a sleeve 40, a bearing sleeve 41 being interposed; and this gear is adapted to be connected with the vertical propel shaft 42 by means of a clutch device 43 splined on the upper end of shaft 42 and having projecting clutch dogs adapted to engage with complementary dogs formed in the upper portion of the gear hub 39. The shaft 42 serves to transmit power to the crawler truck to effect traveling of the truck and thus of the machine. The axis of this shaft 42 coincides with the axis of swing motion of the rotating base on the crawler truck. The structure 42a surrounding the vertical propel shaft 42 is in the nature of a truck center bearing defining the axis of swing motion of the rotating base with respect to the truck. The structure 42a is rigidly connected with the truck and its upper end is fitted in a bearing recess formed at the lower side of the rotating base 5, a bearing sleeve 42b being interposed. A bearing sleeve 42c is also interposed between the structure 42a and the propel shaft 42.

The clutches 38 and 43 are adapted to be controlled and actuated by means of the rocking beam 44, the two projecting ends of which are forked to embrace the clutch devices and to carry pins 45 engaged in grooves 38a and 43a. The supporting shaft 46 for the beam 44 is adapted to be rocked by means of an arm 47, controllable in any suitable manner, so that either one of the clutch devices 38 and 43 may be engaged. The two clutch devices may thus be alternatively connected, so as to alternatively transmit power from the pinion 29 to the shaft 37 and to the shaft 42.

In Figure 2 these parts are illustrated in neutral position, i. e., an intermediate position in which neither one of the clutches is engaged.

At the upper end of the vertical swing shaft 37 a swing motion brake 48 is arranged. It may here be mentioned that the employment of the swing motion brake and also of intermeshing gears alternatively connectable with the vertical swing shaft and with the vertical propel shaft is disclosed in my Patent 2,354,863, issued August 1, 1944.

The arrangement of the present invention, however, constitutes an improvement over the structure shown in said prior Huston patent, particularly with respect to the manner of mounting the intermeshing gears 30 and 31, and with respect to the manner of sealing the apertures in the bottom wall of the lubricant pocket so as to avoid loss of lubricant around the vertical swing and propel shafts (37 and 42).

The supporting sleeve 35 for gear hub 34 constitutes an upward extension of a generally cylindrical shaft positioning member 49 which is received in a socket or aperture formed in the rotating base structure 5. At its lower end, the cylindrical member 49 is interiorly enlarged to accommodate the bearing 50 for the lower end of the shaft 37. The cylindrical member 49, with its sleeve extension 35, is nonrotative and has a snug fit at the surface 51 with the bottom wall 32 of the lubricant pocket. The cylindrical member 49 is provided with a fastening flange 52 adapted to abut against a complementary flange 53 formed on the rotating base structure, the parts being secured together, as by studs 54, with an interposed gasket, if desired.

The upper end of the vertical swing shaft 37 is provided with a bearing 55 which is mounted in a recess formed in the casing part 56 which constitutes a closure member over the top of the upwardly open lubricant pocket. Additional closure members 56a and 56b complete the top closure of the lubricant pocket.

From Figure 2 it will be noted that the sleeve 35 extends upwardly an appreciable distance above the bottom wall 32 of the lubricant pocket. Adjacent its upper end, a grease seal 57 is provided between the sleeve 35 and the shaft 37. Thus, this seal is also spaced appreciably above the bottom of the lubricant pocket, in fact, at an elevation above the normal level of the lubricant contained in the pocket. The oil level in the lubricant pocket is desirably kept somewhat below the upper edge of gears 30 and 31. The seal 57 is effective in avoiding entrance of an excessive quantity of lubricant, as by splash, into the space between the shaft 37 and the sleeve 35; but the seal, being located above the normal lubricant level, need not be relied upon to prevent leakage from the main body of lubricant. The aperture in the bottom wall 32 is effectively sealed against loss of lubricant from the main body thereof by the member 49.

The lubricant in the reservoir or pocket not only serves to directly lubricate the teeth of gearing 29, 30 and 31, but in addition this lubricant is effective to lubricate the bearing for the hub 34 of gear 30, and also for the hub 39 of the gear 31. Lubrication of the gear hubs 34 and 39 occurs as a result of the action of intermeshing teeth of gears 30 and 31, which are partially submerged in the main body of oil in the lubricant pocket. The running of these gears causes lubricant to rise adjacent the zone of intermeshing of the gear teeth, which lubricant then flows radially inwardly toward the axis of each of the two gears (30 and 31), and thence to between the dog clutch teeth formed on the gear hubs for delivery to the bearing sleeves 36 and 41 which are provided respectively, with grooves 59 and 61 to distribute the oil over the bearing surfaces of the sleeves.

The bearing 50 at the lower end of shaft 37 may be lubricated through an aperture 59 adapted to receive a lubricant fitting.

The bearing sleeve 42b which is provided between the rotating base and the center bearing support 42a (surrounding shaft 42) may be lubricated through the aperture 60 which is adapted to receive a lubricant fitting and which communicates with distribution grooves 60a formed in the sleeve 42b. Similarly, sleeve 42c which surrounds shaft 42 may be lubricated through an aperture 65.

The sleeve 40 which surrounds shaft 42 is mounted by means of a flange 62 and studs 63, a gasket being interposed, to thereby provide a tight, leakproof, joint at the lower end of the sleeve with the bottom wall 32 of the lubricant pocket. A grease seal 64 is provided between the sleeve 40 and the shaft 42, this seal (as with the seal 57 above described) being located above the normal level of the main body of lubricant in the pocket.

It may be mentioned that leakage from the lubricant pocket downwardly around shaft 28 on which the pinion 29 is journaled is not a special problem in view of the fact that this shaft need not rotate and may therefore have a leakproof fit in its socket in the base structure 5.

The arrangement of the sleeves 35 and 40 which surround the shafts 37 and 42, respectively, serve not only as a means for preventing lubricant leakage through the apertures in the bottom wall of the lubricant pocket, but they further serve as effective and sturdy supports or journals for the hubs 34 and 39 of the gears 30 and 31.

I claim:

1. In a load handling machine having a machinery base adapted to be mounted on a support, a lubricant pocket having an apertured bottom wall formed in the base, a power shaft extended generally vertically through an aperture in the bottom wall of said pocket, a sleeve for the shaft mounted in the base adjacent the bottom of the pocket and extended upwardly from the bottom wall of the pocket and sealed against said bottom wall to provide against lubricant leakage from the pocket through the aperture in the bottom wall, and, at least in part below the horizontal plane of the upper end of said sleeve, a gear arranged coaxially of the shaft and having its hub journalled on said sleeve within said pocket.

2. A construction according to claim 1 in which said sleeve comprises means for supporting a bearing for said shaft below said bottom wall.

3. A construction according to claim 1 and further including a clutch mechanism for connecting said gear with a upper portion of said shaft above the upper end of said sleeve.

4. In a load handling machine having a base constituting the primary supporting structure for the operating machinery, an upwardly open lubricant pocket with an apertured bottom wall formed in the base, a power shaft extended generally vertically through an aperture in the bottom wall of said pocket, and a sleeve surrounding said shaft and extended upwardly from the bottom wall of the pocket to a point above the normal level of the main body of lubricant adapted to be received in said pocket and sealed against said bottom wall to provide against lubricant leakage from the pocket through the aperture in the bottom wall.

5. In a load handling machine having a rotating base adapted to be mounted on a truck with freedom for swing motion, an upwardly open lubricant pocket with an apertured bottom wall formed in the base, a power shaft extended generally vertically through an aperture in the bottom wall of said pocket and carrying a gear adapted to engage with a ring gear on the truck to effect swing motion of the rotating base on the truck, a sleeve surrounding the shaft and extended upwardly from the bottom wall of the pocket and sealed against said bottom wall to provide against lubricant leakage from the pocket through the aperture in the bottom wall, said sleeve also extending downwardly from said wall and being adapted to maintain said shaft in radial alignment, and a gear arranged coaxially of the shaft and having its hub journalled on said sleeve within said pocket.

6. In a load handling machine having a rotating base adapted to be mounted on a crawler truck, an upwardly open lubricant pocket with an apertured bottom wall formed in the base, a power shaft extended generally vertically through an aperture in the bottom wall of said pocket to a bearing on the truck and serving to transmit driving power to the crawler truck, a sleeve surrounding the shaft and extended upwardly from the bottom wall of the pocket and sealed against said bottom wall to provide against leakage of lubricant from the pocket through the aperture in the bottom wall, and a gear arranged coaxially of the shaft and having its hub journalled on said sleeve within said pocket.

7. In a load handling machine having a rotating base adapted to be mounted on a support, a lubricant pocket with an apertured bottom wall formed in the base, a power shaft extended generally vertically through an aperture in the bottom wall of said pocket, a sleeve surrounding the shaft and extended upwardly from the bottom wall of the pocket and sealed against said bottom wall to provide against lubricant leakage from the pocket through the aperture in the bottom wall, and a lubricant seal arranged between said sleeve and said shaft above the normal level of the main body of lubricant adapted to be received in said pocket.

WILLIAM M. HUSTON.

REFERENCES CITED

The following references are of record in the file of this patent:

UNITED STATES PATENTS

| Number | Name | Date |
|---|---|---|
| 2,131,179 | Joy et al. | Sept. 27, 1938 |
| 2,334,775 | Karp | Nov. 23, 1943 |
| 2,335,318 | Simmons | Nov. 30, 1943 |